(12) United States Patent
Ni et al.

(10) Patent No.: US 12,078,157 B2
(45) Date of Patent: Sep. 3, 2024

(54) VARIABLE DISPLACEMENT PISTON PUMP WITH ELECTRONIC CONTROL UNIT TO PROVIDE DIRECT METERING CONTROL

(71) Applicant: Hamilton Sundstrand Corporation, Charlotte, NC (US)

(72) Inventors: Weishun Willaim Ni, Rockton, IL (US); Edward W. Goy, Crystal Lake, IL (US); Benjamin T. Harder, Sycamore, IL (US); Mark W. Shoemaker, Pecatonica, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 241 days.

(21) Appl. No.: 17/562,214

(22) Filed: Dec. 27, 2021

(65) Prior Publication Data

US 2023/0204029 A1    Jun. 29, 2023

(51) Int. Cl.
*F04B 1/328* (2020.01)
*F02C 9/30* (2006.01)
(Continued)

(52) U.S. Cl.
CPC .............. *F04B 1/328* (2013.01); *F02C 9/30* (2013.01); *F04B 49/06* (2013.01); *F04B 13/00* (2013.01);
(Continued)

(58) Field of Classification Search
CPC .......... F04B 1/328; F04B 1/324; F04B 13/00; F04B 49/06; F04B 2201/12051; F04B 2205/02; F04B 2205/05; F02C 9/30
See application file for complete search history.

(56) References Cited

U.S. PATENT DOCUMENTS

| | | | |
|---|---|---|---|
| 4,456,434 A * | 6/1984 | El Ibiary | F04B 49/002 60/389 |
| 4,494,911 A | 1/1985 | Davis | |

(Continued)

FOREIGN PATENT DOCUMENTS

| | | |
|---|---|---|
| EP | 2414680 B1 | 7/2013 |
| JP | 4275119 B2 | 6/2009 |

OTHER PUBLICATIONS

Extended European Search Report for EP Application No. 22211386.2, dated Jun. 7, 2023, pp. 1-6.

*Primary Examiner* — Charles G Freay
(74) *Attorney, Agent, or Firm* — CANTOR COLBURN LLP

(57) ABSTRACT

A variable displacement piston pump, having: a housing, a pivot assembly to pivot between minimal and maximum pivot angles; a pump cover defining an actuator bore with an actuator piston, an actuator arm extending from the actuator piston to the pivot assembly; and an electronic control unit (ECU) coupled to the pump, the ECU having: a pump controller, a linear variable differential transducer (LVDT) coupled to the pump controller and the actuator piston, and an electrohydraulic solenoid valve (EHSV) coupled to the pump controller, the ECU is configured to: determine a pivot differential for the pivot assembly between a target pivot angle and a current pivot angle; determine a position differential for the actuator piston, corresponding to the pivot differential of the pivot assembly; control the EHSV to move the actuator piston by the position differential; and determine, from the LVDT, that the actuator piston moved by the position differential.

12 Claims, 4 Drawing Sheets

(51) Int. Cl.
*F04B 49/06* (2006.01)
*F04B 13/00* (2006.01)

(52) U.S. Cl.
CPC . *F04B 2201/12051* (2013.01); *F04B 2205/02* (2013.01); *F04B 2205/05* (2013.01)

(56) References Cited

U.S. PATENT DOCUMENTS

| | | |
|---|---|---|
| 8,584,441 B2 | 11/2013 | Benson |
| 2009/0290996 A1 | 11/2009 | Ishizaki |
| 2015/0330373 A1 | 11/2015 | Lindner et al. |
| 2018/0340501 A1* | 11/2018 | Ni .......................... F04B 49/08 |
| 2018/0340531 A1* | 11/2018 | Ni ....................... B64D 37/005 |

* cited by examiner

VARIABLE DISPLACEMENT PISTON PUMP WITH ELECTRONIC CONTROL UNIT TO PROVIDE DIRECT METERING CONTROL

BACKGROUND

The embodiments herein relate to pumps and more specifically to a variable displacement piston pump with an electronic control unit to provide a direct metering control, and a method of operating the same, but a better dynamic response time and slew rate of in-flight during throttle transients and thrust vectoring for the engine Power Thermal Management System (PTMS) saving in weight, reliability, and cycle cost than a conventional hydromechanical control unit.

High pressure fuel systems are used in a variety of applications to provide fuel flow and pressure sufficient to operate gas turbine engines. This can include providing high pressure fuel to actuators that operate to control a variable area engine nozzle portion of the engine.

Fuel systems also may be designed to provide excess fuel capacity, e.g., to assist main fuel pumps, to meet fuel demands during operation conditions. If fuel is supplied from such systems too rapidly, a rich mixture may cause a surge.

BRIEF SUMMARY

Disclosed is a direct metering control variable displacement piston pump, including: a pump housing defining a housing cavity, a pivot assembly configured to pivot within the pump housing between minimal and maximum pivot angles; a pump cover disposed against the pump housing, the pump cover defining an actuator bore, an actuator piston in the actuator bore, an actuator arm extending from the actuator piston to the pivot assembly; and an electronic control unit (ECU) operationally coupled to the pump, the ECU including: a pump controller, a linear variable differential transducer (LVDT) operationally coupled to the pump controller and the actuator piston, and an electrohydraulic solenoid valve (EHSV) operationally coupled to the pump controller, wherein the ECU is configured to: determine a pivot differential for the pivot assembly between a target pivot angle and a current pivot angle; determine a position differential for the actuator piston, corresponding to the pivot differential of the pivot assembly; control the EHSV to thereby move the actuator piston by the position differential; and determine, from the LVDT, that the actuator piston moved by the position differential.

In addition to one or more aspects of the pump, or as an alternate, the ECU is further configured to: monitor to identify pressure perturbations in the pump resulting from pressure changes to a fluid flow; and react to pressure perturbations in the pump with controlled metered movement of the actuator piston.

In addition to one or more aspects of the pump, or as an alternate: the pump cover further includes: an inlet port and an inlet passage that extends from the inlet port to the pump housing; an outlet port and an outlet passage that extends from the outlet port to the EHSV and to the pump housing; a return passage that extends from the EHSV to the pump housing; and a coupling passage that extends between the actuator bore and the EHSV.

In addition to one or more aspects of the pump, or as an alternate, the pump further includes: sensors operationally connected to the ECU, the sensors including: an inlet pressure sensor, disposed in the return passage, configured to sense pump inlet pressure; and an outlet pressure sensor, disposed in the outlet passage, configured to sense pump outlet pressure, wherein the ECU is configured to monitor to identify pressure perturbations in the pump resulting from pressure changes to the fluid flow by sensed pressure fluctuations at the inlet and outlet during movement of the pivot assembly.

In addition to one or more aspects of the pump, or as an alternate, the actuator bore defines a top end and a bottom end, wherein the bottom end is disposed against the pump housing, and the pump further includes: a biasing member configured to bias the pivot assembly toward a maximum pivot angle; an actuator pressure sensor, disposed in the coupling passage, configured to sense pressure at the actuator piston, wherein the ECU is configured to control the EHSV by: increasing pressure against the actuator piston to move the actuator piston toward the bottom end of the actuator bore, countering a biasing force that biases the pivot assembly toward the maximum pivot angle; or reducing pressure against the actuator piston, thereby enabling the biasing force to move the pivot assembly toward the maximum pivot angle, and thereby moving the actuator piston toward the bottom end of the actuator bore.

In addition to one or more aspects of the pump, or as an alternate, the pump is configured so that: when the actuator piston is disposed at the top end of the actuator bore, the pivot assembly is disposed at the maximum pivot angle; and when the actuator piston is disposed at the bottom end of the actuator bore, the pivot assembly is disposed at a minimum pivot angle.

In addition to one or more aspects of the pump, or as an alternate, the pump further includes: a pivot base defining a pivot base cavity, and a coupler shaft seated in the pivot base cavity, the coupler shaft defines piston seats and a coupler shaft bore; a cylinder barrel configured to slide within the pivot assembly, the cylinder barrel defines piston bores and a universal shaft bore; and pistons that extend from the piston seats in the coupler shaft into the piston bores in the cylinder barrel, and a universal shaft that extends from the coupler shaft bore in the coupler shaft to the universal shaft bore in the cylinder barrel.

In addition to one or more aspects of the pump, or as an alternate, the pump is a bent axis pump.

Further disclosed is a gas turbine engine, including: a fuel supply; a pump having one or more of the above disclosed aspects; an engine pressure regulator configured to receive fuel from the pump; and an engine controller operationally coupled to the ECU and configured to communicate parameters to the ECU indicative of the target pivot angle for the pivot assembly.

In addition to one or more aspects of the engine, or as an alternate, the pressure regulator is configured to direct a pressure controlled fuel flow to the engine.

Further disclosed is a method of controlling a variable displacement piston pump, the method including a: determining, via a pump electronic control unit (ECU) that is operationally coupled to the pump, a pivot differential for a pivot assembly of the pump between a target pivot angle and a current pivot angle; determining, by the ECU, a position differential for an actuator piston of the pump, corresponding to the pivot differential for the pivot assembly; controlling an electrohydraulic solenoid valve (EHSV) of the ECU, to thereby move the actuator piston by the position differential; and determine, by a linear variable differential transducer (LVDT) of the ECU, that the actuator piston moved by the position differential.

In addition to one or more aspects of the method, or as an alternate, the method further includes monitoring to identify pressure perturbations in the pump resulting from pressure changes to a fluid flow; and reacting to pressure perturbations in the pump with controlled, metered movement of the actuator piston.

In addition to one or more aspects of the method, or as an alternate, the method further includes: sensing pump inlet pressure via an inlet pressure sensor operationally coupled to the ECU and located in a return passage that is fluidly coupled to the EHSV; sensing pump outlet pressure via an outlet pressure sensor operationally coupled to the ECU and located in an outlet passage of the pump; monitoring to identify pressure perturbations in the pump resulting from pressure changes to the fluid flow by sensed pressure fluctuations at the inlet and outlet during movement of the pivot assembly.

In addition to one or more aspects of the method, or as an alternate, the method further includes sensing pressure at an actuator bore via an actuator pressure sensor operationally coupled to the ECU and located in a coupling passage between the actuator bore and the EHSV, and wherein controlling the EHSV includes: increasing pressure against the actuator piston to move the actuator piston toward a bottom end of the actuator bore, countering a biasing force that biases the pivot assembly toward a maximum pivot angle; or reducing pressure against the actuator piston, thereby enabling the biasing force to move the pivot assembly toward the maximum pivot angle, and thereby moving the actuator piston toward the bottom end of the actuator bore; and determining a pressure required to move the actuator piston toward the bottom end of the actuator bore as a difference between and pressure in the actuator bore.

In addition to one or more aspects of the method, or as an alternate, the method further includes the ECU causing movement of the actuator piston between: a top end of the actuator bore to position the pivot assembly at the maximum pivot angle; and the bottom end of the actuator bore to position the pivot assembly at a minimum pivot angle.

In addition to one or more aspects of the method, or as an alternate, the method further includes: the ECU receiving a communication from an engine controller of a gas turbine engine with parameters indicative of the target pivot angle for the pivot assembly.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
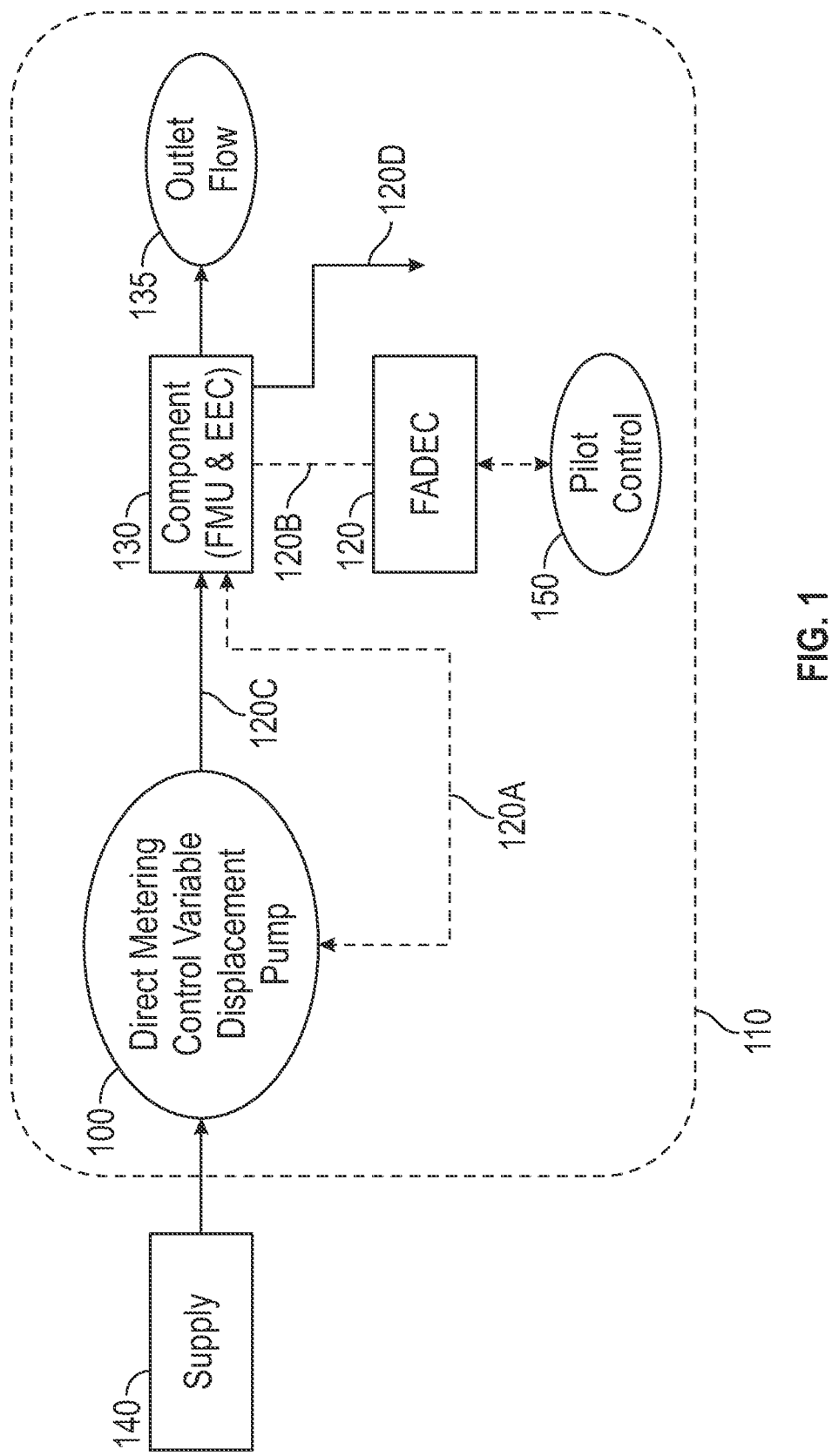
FIG. 1 is an engine 110 that includes a direct metering control variable displacement pump with sets the power level sensed from component (FUM and EEC) and FADEC normally by a lever in the cockpit according to one or more embodiments.

Turning to FIG. 1, disclosed is an engine 110 that includes a direct metering control variable displacement piston pump 100 (for simplicity, a pump 100). While shown in an engine, it shall be understood that embodiments herein can be applied to pump that are not part of an engine as well.

In one embodiment, the pump 100 can be any type of pump including a bent axis pump or a vane pump. The pump 100 may be installed in an aircraft system such as a gas turbine engine 110 having, for example, a full authority digital engine control (FADEC) 120 and component 130 of FMU and EEC that are operationally coupled to the pump 100 via communication lines 120A. The FADEC 120 is a system consisting of a digital computer that is called an electronic engine controller (EEC) or engine control unit (EEU), and its related accessories that control all aspects of aircraft engine performance.

In the engine 110, the pump 100 may be a high pressure (HP) pump, an actuator pump or a main fuel pump (MFP). An engine component, which may be a fuel pressure regulator otherwise referred to as a fuel manager unit (or FMU and EEC 130), may be configured to receive fuel from a fuel supply 140 via the pump 100 though passage 120C. Outlet of the FMU and EEC 130 may be a pressure-controlled fuel flow 135, which may be directed to the engine 110. The FMU and EEC 130 may be operationally coupled to the FADEC via a communication path 120B. The FMU and EEC 130 may be fluidly coupled to the pump via passage 120D, which may be utilized as a bypass return to the pump inlet. The FADEC 120 may receive input from a pilot-controlled system 150, such as an instrument Computer-Aided-Diagnosis (CAD) panel, that is indicative of a need for an increase or decrease in thrust and vector control. From this, the FADEC 120 would send instructions to component 130 via the communication lines 120A to the pump 100 to change its internal configuration as discussed in greater detail below.

Figure 2:
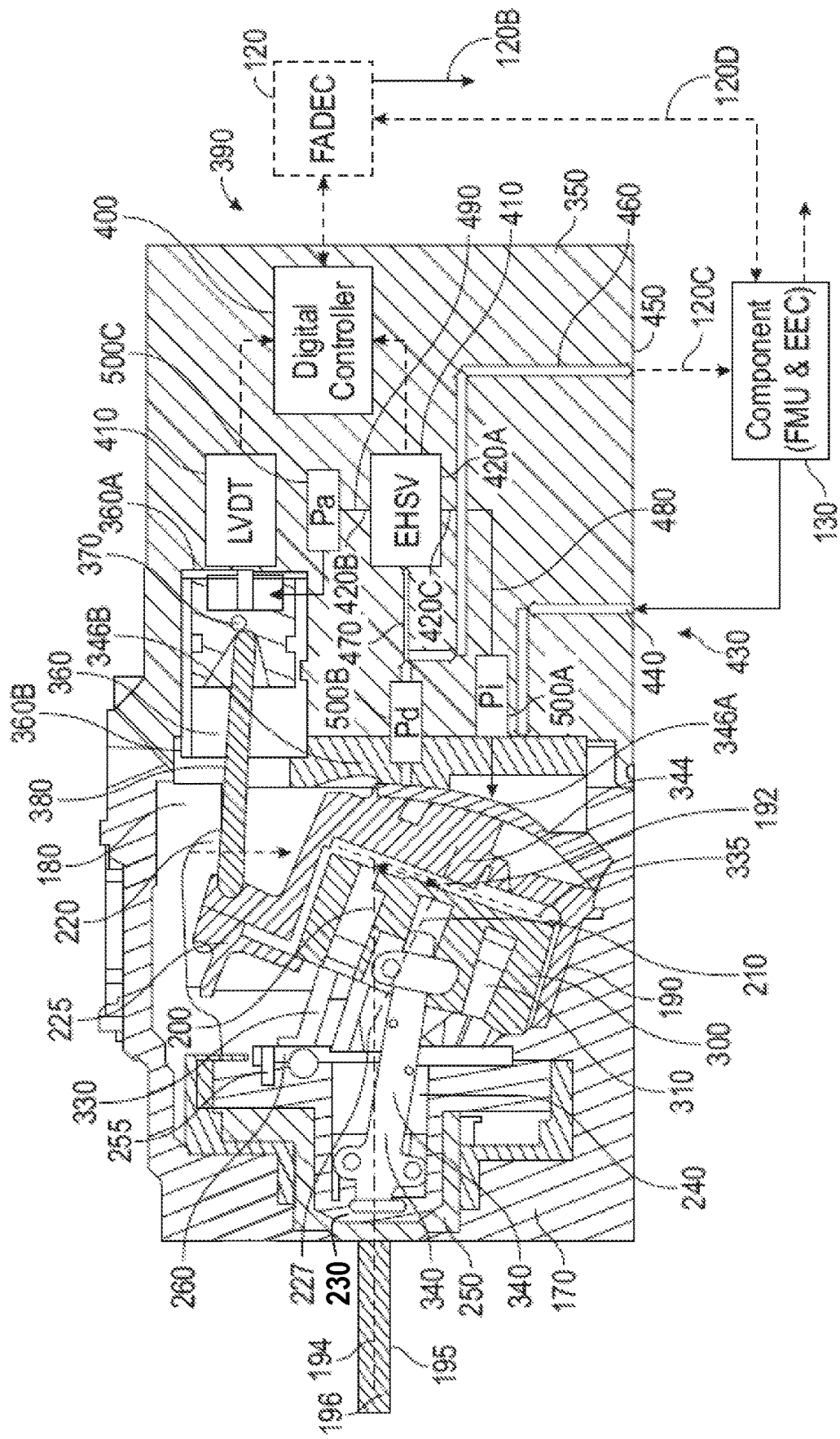
FIG. 2 shows a cross section of the pump with an electronic control unit.

Turning to FIG. 2, the pump 100 includes a pump housing 170. The pump housing 170 defines a housing cavity 180. A pivot assembly 190 (or pivot upper housing) is configured to pivot (or swing) within the pump housing 170 to an optimized pivot (or tilting or swing) angle 192. The pivot tilting angle 192 is measured relative to a drive shaft axis 194 of a drive shaft 195 having a drive shaft gearbox end 196, and ranges between minimal (along the drive shaft) and maximum (offset from the drive shaft) pivot tilting angles 200 to 210. A biasing member 220 is configured to bias the pivot assembly 190 toward the maximum pivot angle 210, to prevent a circumstance in which the pivot assembly 190 is locked at the minimum pivot angle 200. A plate retainer 225 prevents pivot assembly 190 tilting rotation in the direction that is stopped at minimum tilting angle 200.

The pivot assembly 190 includes a pivot arm 227 that is supported to pivot at a pivot base 230 defines a base cavity 240. A coupler shaft 250 is seated in the pivot base cavity 240. The coupler shaft 250 has a piston flange 255 that defines a piston retainer 260 and a coupler shaft bore 270. The coupler shaft 250 is operationally connected to the drive shaft 192. A cylinder barrel 300 is configured to slide within the pivot assembly 190 and defines piston bores 310.

Pistons 330 extend from the piston retainer 260 in the coupler shaft 250 into the piston bores 310 in the cylinder barrel 300. A port plate 335 may be disposed at the cylinder head (or upper end). A universal shaft (or link) 340 extends from the coupler shaft bore 270 in the coupler shaft 250 to the cylinder barrel 300. According to embodiments, there may be an odd number of pistons 330, such as seven, nine, or eleven pistons, disposed in the cylinder barrel 300. The pistons 330 may be configured to reciprocate moving to either a suction or discharge function within the cylinder barrel 300. A cylinder cover 345, at a top end of the pivot assembly 190, includes a bottom portion of a slip guide 346A, which is a track member that prevent the pivot assembly 190 from spinning by rotation of the drive shaft 192.

A pump cover 350 (or rear cover) is disposed against the pump housing 170. The pump cover 350 includes the top portion of the slipper guide 356B to operationally couple with the bottom portion of the slipper guide 346A. The pump cover 350 defines an actuator bore 360. An actuator piston 370 is disposed in the actuator bore 360. An actuator arm 380 (or rod) extends from the actuator piston 370 to the pivot assembly 190. The actuator bore 360 defines a top end 360A and a bottom end 360B. The bottom end 360B of the actuator bore 360 is disposed against the pump housing 170. The pump 100 is configured so that when the actuator piston 370 is disposed at the top end 360A of the actuator bore 360, the pivot assembly 190 is disposed at the maximum pivot angle 210. When the actuator piston 370 is disposed at the bottom end 360B of the actuator bore 360, the pivot assembly 190 is disposed at the minimum pivot angle 200. In one embodiment, the pump cover 350 or ECU 390 may be magnetically coupled to the pump housing 170.

Figure 3:
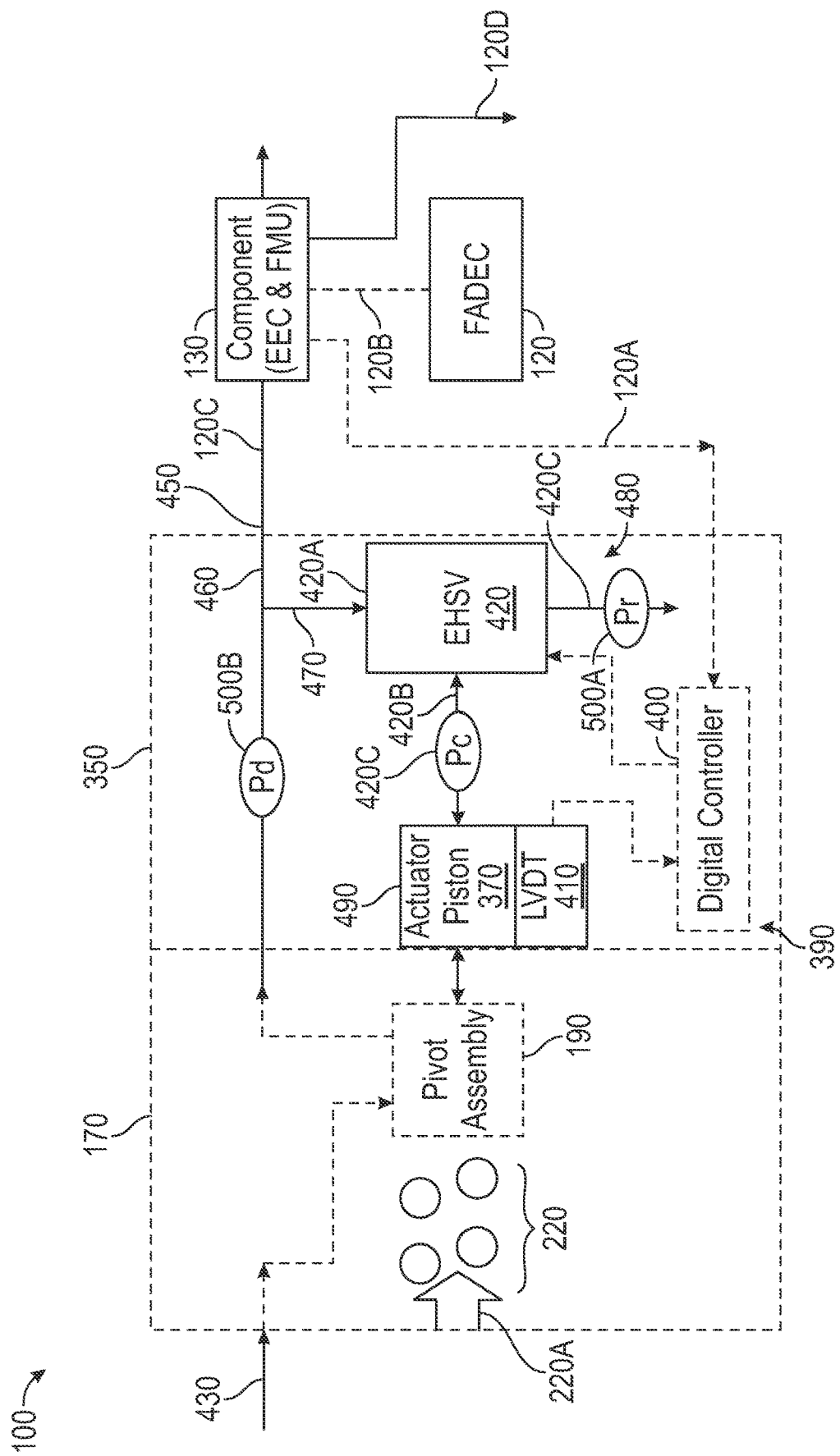
FIG. 3 shows is a schematic illustration showing additional details of the direct metering control variable displacement pump.

As shown in FIGS. 2 and 3, according to an embodiment, an electronic control unit (ECU) 390 is operationally coupled to the pump 100 and may be within the cover 350. The ECU 390 includes a pump controller 400 for controlling the pump 100 in a direct metering technique. The ECU 390 includes a linear variable differential transducer (LVDT) 410 that is operationally coupled to the controller 400 and the actuator piston 370. The ECU 390 also includes an electrohydraulic solenoid valve (EHSV) 420 with a supply port 420A, a control (or actuation) port 420B and a return port 420C. The EHSV 420 is operationally coupled to the controller 400. The ECU 390 may be operationally connected to the FADEC 120, e.g., via the communication lines 120A through component 130 by 120B.

The pump cover 350 includes an inlet port 430 and an inlet passage 440 that extends from the inlet port 430 to the pump housing 170. The pump cover 350 also includes an outlet port 450 and an outlet passage 460 that extends from the outlet port 450 to the pump housing 170. A branch of the outlet passage forms a supply passage 470 for the EHSV 420. The pump cover 350 further includes a return passage 480 that extends from the EHSV 420 to the pump housing 170. A coupling passage 490 extends between the actuator bore and the EHSV 420.

According to an embodiment, sensors 500 are operationally connected to the ECU 390. The sensors 500 include an inlet (or return passage) pressure sensor 500A disposed in the return passage 480. The inlet sensor 500A is configured to sense pump inlet pressure. An outlet (or discharge) pressure sensor 500B is disposed in the outlet passage 460. The outlet sensor 500B is configured to sense pump outlet pressure. An actuator (or charge passage) pressure sensor 500C is disposed in the coupling passage 490. The actuator pressure sensor 500C is configured to sense pressure at the actuator piston 370, and more specifically on a top end 370A of the actuator piston 370. Also shown in FIG. 3 is a schematic representation the spring force 220A from the biasing members 220 that the actuator piston 370 must overcome to move the pivot assembly 190 toward the minimum pivot angle 200.

Figure 4:
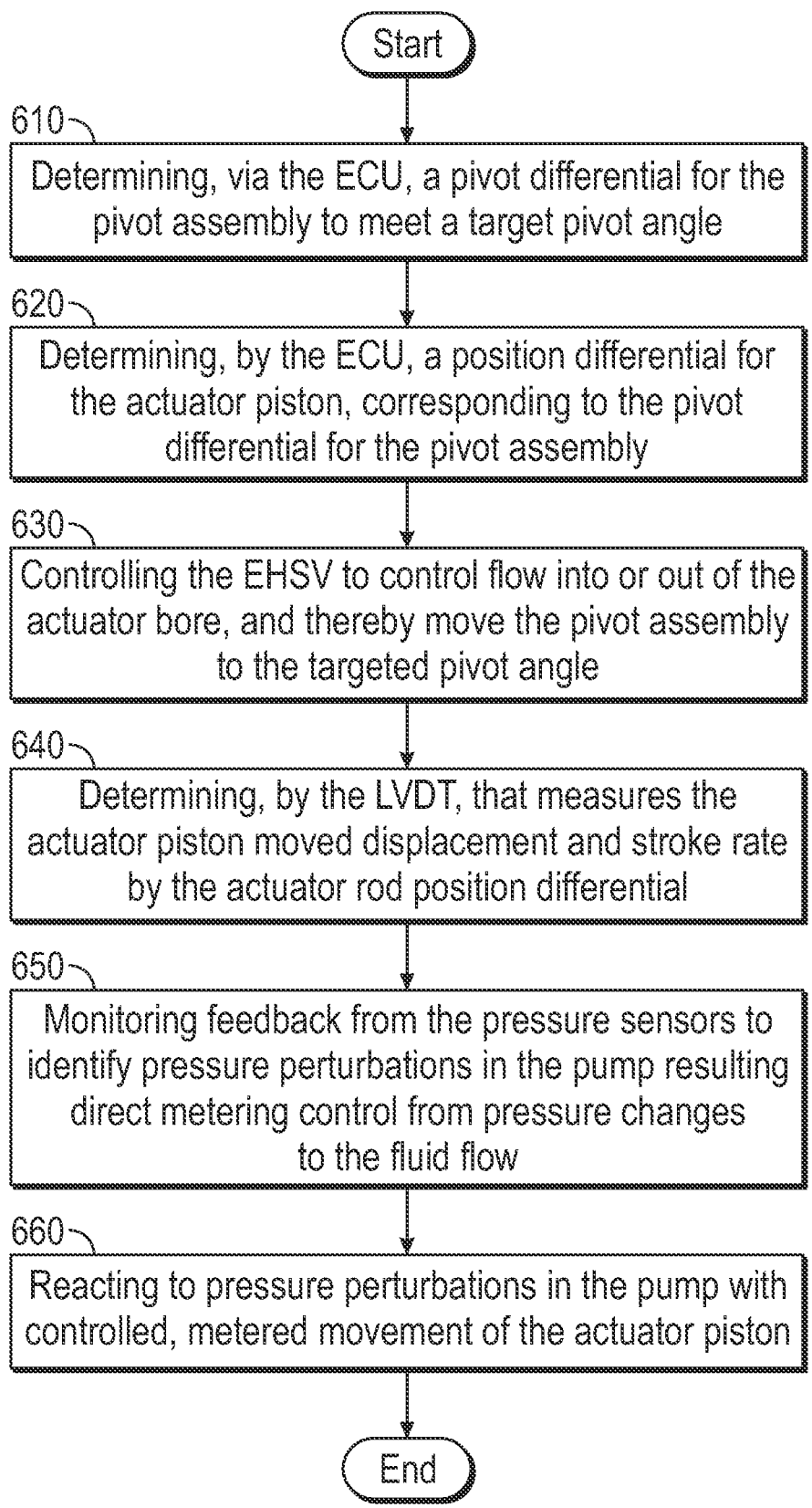
FIG. 4 is a flowchart showing a method of operating the direct metering control variable displacement pump.

Turning to FIG. 4, a flowchart shows a method of direct metering and controlling the pump 100. As shown in block 610, the method may include determining, via the ECU 390, a pivot differential for the pivot assembly 190 through LVDT 410 to meet a target pivot angle for it. For example, in an aircraft engine system such as a gas turbine engine 110, the ECU 390 may receive a communication from the FADEC 120 with parameters indicative of a target pivot angle for the pivot assembly 190, e.g., in order to achieve a desired output change in thrust and vector control. The pivot differential of the pivot assembly 190 can be determined as a difference between the current pivot angle and the target pivot angle for the pivot assembly 190. As can be appreciated, a magnitude of the pivot differential may be positive or negative (e.g., representing bidirectional movement in the actuator bore 360), depending on whether the output pressure is required to be increased or reduced.

As shown in block 620, the method may include determining, by the ECU 390, a position differential for the actuator piston 370, corresponding to the pivot differential for the pivot assembly 190. The position differential would be, e.g., moving the actuator piston 370 toward the bottom end 360B of the actuator bore 360 to decrease the pivot angle and thus the output pressure, or moving the actuator piston 370 toward the top end 360A of the actuator bore 360 to increase the pivot angle and thus the output pressure. As can be appreciated when the actuator piston 370 is at the top end 360A of the actuator bore 360, the pivot assembly 190 is positioned at the maximum pivot angle 210. When the actuator piston 370 is at the bottom end 360B of the actuator bore 360, the pivot assembly 190 is at the minimum pivot angle 200.

As shown in block 630, the method may include controlling the EHSV 420 to control flow into or out of the actuator bore 360, and thereby move the pivot assembly 190 to the targeted pivot angle, e.g., at or between the minimum and maximum angles 200 to 210 within a stroke rate to meet dynamic response rise time and slew rate requirement. For example, in aircraft STOVL transient condition, if the target pivot angle is shallower than the current angle, the EHSV 420 would direct flow from the pump outlet passage 460, via the EHSV supply passage 470, to the coupling passage 490, and into the actuator bore 360. This direct metering control would increase pressure rapidly against the actuator piston 370 until the pressure overcomes the biasing force 220A from the biasing member 220. As a result, the actuator piston 370 would move quickly within expected stroke rate toward the bottom end 360B of the actuator bore 360, and the pivot angle of the pivot assembly 190 would be reduced, which would decrease output pressure.

On the other hand, if the target pivot angle is greater than the current angle, the EHSV 420 would direct flow from the coupling passage 490 to the EHSV return passage 480. This would reduce the pressure against the actuator piston 370 to enable the biasing forces 220A from the biasing member 220 to cause the actuator piston 370 to move toward the top end 360A of the actuator bore 360. As a result, the pivot angle of the pivot assembly 190 would increase, which would increase output pressure.

With the disclosed embodiments, the actuator pressure sensor 500C can be utilized to sense pressure at the actuator bore 360, and therefore utilized to control the EHSV 420. A pressure required to move the actuator piston 370 toward the bottom end 360B of the actuator bore 360 would be greater than both the current pressure in the bore 360 and the biasing force 220A from the biasing member 220. On the other hand, pressure required to move to move the actuator piston 370 toward the top end 360A of the actuator bore 360 would be less than the current pressure in the actuator bore 360, e.g., between the top end 360A of the bore and the top end 370A of the actuator piston 370.

As shown in block 640, the method includes determining, by the LVDT 410, that the actuator piston 370 moved transposition and stroke rate by the position differential. As shown in block 650, during movement of the actuator piston 370, the process includes monitoring feedback from the pressure sensors 500A, 500B to identify pressure perturbations in the pump 100, e.g., based on the pressure rise between the pump input and output, resulting from pressure changes to the fluid flow. As shown in block 660, the method includes reacting to pressure perturbations in the pump 100 with controlled, metered movement of the actuator piston 370, thus controlled, metering movement of the pivot assembly 190. This feedback loop enables direct metering control of the actuator piston 370, and thus the pivot assembly 190, to reduce the potential of damaging reactions to flow changes in the pump 100.

The above embodiments enable a steady and metered motion of the pivot assembly 190 by providing steady and metered motion of the actuator piston 370 in the actuator bore 360. Metered control occurs by the EHSV 420 providing a controlled flow of the fluid into and out of the actuator bore 360, and the LVDT 410 providing feedback as to the position of the actuator piston 370 in the actuator bore 360. Thus, the ECU 390 minimizes pressure waves (e.g., ripple energy) in the hydraulic system by providing a rapid response to such waves via metered control of the actuator piston 370.

The FMU and EEC 130 contains pressure sensor for sensing required forces for actuating an engine thrust vectoring control, and flow meter for measuring the engine thrust burning flow prerequisite. The pressure sensor of the FMU and EEC 130 detects the system required pressure and provides feedback to the digital control 400 and EHSV 420 to adjust the titling angle 195 of the pivot assembly 350 through the LVDT 400, which measures the stroke of the actuator piston 370 to determine proper delivery flow rate and responsively modulates the system pressure changes.

With the disclosed embodiments, the metered control actuator piston 370 can prevent the actuator piston 370, and thus the pivot assembly 190, from moving too quickly or slowly to a targeted position, or from moving too far or not far enough. The metered control of the actuator piston 370 can also rapidly account for fluctuations in fluid pressure by enabling a rapid response by it.

Benefits of the embodiments include a relatively quick and accurate direct metering control of the actuator piston 370, and therefore the pivot assembly 190 of the pump 100, to thereby provide a target flow rate and pressure rise. The embodiments provide a stable, fast, and precise control of the pivot angle of the pivot assembly 190 to reduce the likelihood of a hydraulic system pressure spike. The embodiments provide an increasing mean time before failure (MTBF) by lowering the pressure ripple to reduce the structure stress fluctuation for the fatigue life and improve reliability. Further, the embodiments utilize the EHSV 420 and LVDT 410 instead of, for example, a more complex conventional hydraulic compensator, to provide for a relatively light weight pump 100 having a relatively simplified flow path configuration in the pump cover 350.

As described above, embodiments can be in the form of processor-implemented processes and devices for practicing those processes, such as a processor utilized in Unmanned Aerial Vehicle (UAV). Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A direct metering control variable displacement piston pump, comprising:
  a pump housing defining a housing cavity, a pivot assembly configured to pivot within the pump housing between minimal and maximum pivot angles;
  a pump cover disposed against the pump housing, the pump cover defining an actuator bore, an actuator piston in the actuator bore, an actuator arm extending from the actuator piston to the pivot assembly; and
  an electronic control unit (ECU) operationally coupled to the pump, the ECU comprising: a pump controller, a linear variable differential transducer (LVDT) operationally coupled to the pump controller and the actuator piston, and an electrohydraulic solenoid valve (EHSV) operationally coupled to the pump controller,
  wherein the ECU is configured to:

determine parameters indicative of a pivot assembly angle;
control the EHSV to thereby move the actuator piston; and
determine, from the LVDT, that the actuator piston moved;
the ECU is further configured to: monitor to identify pressure perturbations in the pump resulting from pressure changes to a fluid flow; and react to pressure perturbations in the pump with controlled metered movement of the actuator piston; and
the pump cover further includes: an inlet port and an inlet passage that extends from the inlet port to the pump housing; an outlet port and an outlet passage that extends from the outlet port to the EHSV and to the pump housing; a return passage that extends from the EHSV to the pump housing; and a coupling passage that extends between the actuator bore and the EHSV.

2. The pump of claim 1, further comprising:
sensors operationally connected to the ECU, the sensors including:
  an inlet pressure sensor, disposed in the return passage, configured to sense pump inlet pressure; and
  an outlet pressure sensor, disposed in the outlet passage, configured to sense pump outlet pressure,
  wherein the ECU is configured to monitor to identify pressure perturbations in the pump resulting from pressure changes to the fluid flow by sensed pressure fluctuations at the inlet and outlet during movement of the pivot assembly.

3. The pump of claim 2, wherein
the actuator bore defines a top end and a bottom end, wherein the bottom end is disposed against the pump housing, and
the pump further comprises:
  a biasing member configured to bias the pivot assembly toward a maximum pivot angle;
  an actuator pressure sensor, disposed in the coupling passage, configured to sense pressure at the actuator piston,
  wherein the ECU is configured to control the EHSV by:
    increasing pressure against the actuator piston to move the actuator piston toward the bottom end of the actuator bore, countering a biasing force from the biasing member to move the pivot assembly toward the minimum pivot angle; or
    reducing pressure against the actuator piston, thereby enabling the biasing force to move the pivot assembly toward the maximum pivot angle, and thereby moving the actuator piston toward the top end of the actuator bore.

4. The pump of claim 3, wherein
the pump is configured so that:
  when the actuator piston is disposed at the top end of the actuator bore, the pivot assembly is disposed at the maximum pivot angle; and
  when the actuator piston is disposed at the bottom end of the actuator bore, the pivot assembly is disposed at a minimum pivot angle.

5. The pump of claim 1, further comprising:
a pivot base defining a pivot base cavity, and a coupler shaft seated in the pivot base cavity, the coupler shaft defines piston seats and a coupler shaft bore;
a cylinder barrel configured to slide within the pivot assembly, the cylinder barrel defines piston bores and a universal shaft bore; and
pistons that extend from the piston seats in the coupler shaft into the piston bores in the cylinder barrel, and a universal shaft that extends from the coupler shaft bore in the coupler shaft to the universal shaft bore in the cylinder barrel.

6. The pump of claim 1, wherein
the pump is a bent axis pump.

7. A gas turbine engine, comprising:
a fuel supply;
the pump of claim 1;
an engine pressure regulator configured to receive fuel from the pump; and
an engine controller operationally coupled to the ECU and configured to communicate parameters to the ECU indicative of a target pivot angle for the pivot assembly to meet pressure requirements.

8. The engine of claim 7, wherein
the pressure regulator is configured to direct a pressure controlled fuel flow to the engine.

9. A method of controlling a variable displacement piston pump, the method including:
determining, via a pump electronic control unit (ECU) that is operationally coupled to the pump, parameters indicative of a pivot assembly angle;
controlling an electrohydraulic solenoid valve (EHSV) of the ECU, to thereby move the actuator piston; and
determining, by a linear variable differential transducer (LVDT) of the ECU, that the actuator piston has moved;
monitoring LVDT signal value to identify pressure perturbations in the pump resulting from pressure changes to a fluid flow; and
reacting to pressure perturbations in the pump with controlled, metered movement of the actuator piston;
sensing pump inlet pressure via an inlet pressure sensor operationally coupled to the ECU and located in a return passage that is fluidly coupled to the EHSV;
sensing pump outlet pressure via an outlet pressure sensor operationally coupled to the ECU and located in an outlet passage of the pump; and
monitoring to identify pressure perturbations in the pump resulting from pressure changes to the fluid flow by sensed pressure fluctuations at the inlet and outlet during movement of the pivot assembly.

10. The method of claim 9, further comprising
sensing pressure at an actuator bore via an actuator pressure sensor operationally coupled to the ECU and located in a coupling passage between the actuator bore and the EHSV, and
wherein controlling the EHSV includes:
  increasing pressure against the actuator piston to move the actuator piston toward a bottom end of the actuator bore, countering a biasing force that biases the pivot assembly toward minimum pivot angle; or
  reducing pressure against the actuator piston, thereby enabling the biasing force to move the pivot assembly toward the maximum pivot angle, and thereby moving the actuator piston toward the bottom end of the actuator bore; and
  determining a pressure required to move the actuator piston toward the bottom end of the actuator bore.

11. The method of claim 10, further comprising
the ECU causing movement of the actuator piston between:
  a top end of the actuator bore to position the pivot assembly at the maximum pivot angle; and the bottom end of the actuator bore to position the pivot assembly at a minimum pivot angle.

12. The method of claim 9, further comprising:

the ECU receiving a communication from an engine controller of a gas turbine engine with parameters indicative of the target pivot angle for the pivot assembly.

\* \* \* \* \*